United States Patent [19]

Ootaguro et al.

[11] Patent Number: 5,318,882
[45] Date of Patent: Jun. 7, 1994

[54] OPTICAL RECORDING MEDIUM CONTAINING A LIGHT STABILIZER COMPRISED OF ARYL NITROGEN COMPOUND

[75] Inventors: Kunihiko Ootaguro; Emiko Hamada; Yosikazu Takagisi; Toru Fujii, all of Tokyo, Japan

[73] Assignee: Taiyo Yuden Co., Ltd., Tokyo, Japan

[21] Appl. No.: 686,870

[22] Filed: Apr. 16, 1991

Related U.S. Application Data

[63] Continuation-in-part of Ser. No. 512,984, Apr. 23, 1990, abandoned.

[30] Foreign Application Priority Data

| May 16, 1989 | [JP] | Japan | 1-120537 |
| May 16, 1989 | [JP] | Japan | 1-120538 |
| May 16, 1989 | [JP] | Japan | 1-120539 |
| May 16, 1989 | [JP] | Japan | 1-120540 |
| Feb. 7, 1990 | [JP] | Japan | 2-27389 |

[51] Int. Cl.$^5$ .............................. G11B 7/24
[52] U.S. Cl. ........................ 430/495; 430/945; 346/135.1
[58] Field of Search ............ 430/945, 495, 607; 346/135.1

[56] References Cited

U.S. PATENT DOCUMENTS

| 3,763,015 | 10/1975 | Morimoto et al. | 203/9 |
| 3,886,106 | 5/1975 | Lohr, Jr. et al. | 524/400 |
| 4,098,841 | 7/1978 | Nagata et al. | 525/530 |
| 4,430,426 | 2/1984 | Beebe et al. | 430/604 |
| 4,656,121 | 4/1987 | Sato et al. | 430/495 |
| 4,767,693 | 8/1988 | Oba et al. | 430/270 |
| 4,822,665 | 4/1989 | Schulz et al. | 428/222 |
| 4,996,089 | 2/1991 | Saito et al. | 428/64 |
| 4,999,281 | 3/1991 | Inagaki et al. | 430/495 |
| 5,045,440 | 9/1991 | Onorato et al. | 430/495 |
| 5,219,823 | 6/1993 | Chapman | 503/227 |

Primary Examiner—Charles L. Bowers, Jr.
Assistant Examiner—John A. McPherson
Attorney, Agent, or Firm—Frishauf, Holtz, Goodman & Woodward

[57] ABSTRACT

Certain types of aryl nitrogen compounds are found to be useful not only for effectively rendering dyes lightfast but also for using as an additive that has high solubility in solvents and sufficiently good miscibility with dyes to insure that their solubility will not be impaired. They can be used for preventing various reactions that cause deterioration by light in organic dyes, in particular cyanine dyes. They can also be used for improving the keeping quality and recording and reproduction characteristics of optical recording media that use organic dyes in the form of thin films. Representative examples include N, N-lower alkyl substituted nitrosoanilines, phenol or naphthol derivatives having at least one nitroso group, nitrosodiphenylamine and its derivatives and 1-pycryl-2, 2-diarylhydrazyl free radicals.

25 Claims, No Drawings

OPTICAL RECORDING MEDIUM CONTAINING A LIGHT STABILIZER COMPRISED OF ARYL NITROGEN COMPOUND

CROSS REFERENCE TO RELATED APPLICATION

This is a continuation-in-part application of application Ser. No. 07/512,984, filed Apr. 23, 1990, now abandoned.

BACKGROUND OF THE INVENTION

1. Field of the Invention

The present invention relates to a light stabilizer, particularly to a novel light stabilizer comprised of an arly nitrogen compound which is useful when used as a stabilizer for improving lightfastness of light-vulnerable organic materials. More specifically, the present invention relates to a light stabilizer of cyanine dyes and uses thereof. The term "light-vulnerable organic materials" as used herein refers collectively to organic materials that deteriorate, degrade, change, fade in color, change in color or experience other changes upon exposure to light, and among other things, cyanine dyes are particularly important materials to be treated by the light stabilizer of the present invention.

2. Background of the Invention

Organic dyes have been extensively used in coloring fibers and plastics and in such applications as analytical indicators and photographic light-sensitive materials. Recently, an unconventional use of organic dyes as "functional dyes" has expanded, as examplified by use in dyes lasers, conversion of optical energy and optical recording. Whichever application organic dyes are to be put to use, they have to meet several requirements.

Optical recording media that use a thin layer of organic dyes as a recording layer are also well known. If such optical recording media are left to stand for a prolonged period under exposure to light in various forms, the organic dyes deteriorate by light and their recording characteristics are impaired. It is therefore very important that optical recording media using organic dyes be protected against deterioration by light. A common practice of protecting such optical recording media against deterioration by light is to incorporate various light stabilizers. However, conventionally used light stabilizers do not have high degrees of lightfastness and miscibility with dyes, so the keeping quality of the recording layer and its recording and reproduction characteristics have been far from being completely satisfactory.

Recording media are conventionally formed in thin films by evaporation, coating and other techniques. The formation of thin films by coating is industrially advantageous over other methods since it is capable of producing large films in high volumes. In order for the coating method to be adopted, all components of a recording medium must be soluble in solvents. Among the conventionally used components of recording media, many organic dyes are fairly highly soluble in common organic solvents but, on the other hand, most light stabilizers are poorly soluble in organic solvents and hence it has been difficult to form thin films of recording media by the coating method using light stabilizers.

While several characteristics are indispensable to dyes, most important are good dyeability, high washing fastness. adequately high color densities and high color fastness to sunlight Because of color sharpness and high color density (i.e., high molar extinction coefficient), cyanine dyes have drawn much attention of researchers, but their use has been limited on account of poor color fastness to sunlight (Horiguchi,"Synthetic Dyes", p. 311, Sankyo Shuppan).

Various methods have been proposed to improve the color fastness of dyes to sunlight. One method is to add a metal complex that absorbs light in the longer wavelength range (Japanese Patent public Disclosure Nos. 59-215892, 62-193891, 62-207688, 63-199248 and 63-19293). Another method is to add a material that retards fading in color by oxygen (Japanese Patent Public Disclosure No. 59-55705). Still another method is to introduce a ring into a methine chain (Japanese Patent Public Disclosure Nos. 62-187088, 62-196180, 62-207684 and 63-33477). However, none of these proposals succeeded in solving the problems in a satisfactory way. Further, the addition of metal complexes and the improvement of a dye structure suffer the disadvantage that the dye often becomes less soluble in various solvents.

The conventional methods of light stabilization which chiefly rely upon the use of additives or the improvement of dye structures impair the solubility of dyes in solvents, particularly in polar solvents, so in most cases &hey have been unsatisfactory for the purpose of solving the problems of the prior art in terms of the method of using dyes and the amount in which they are used. Hence, a first object of the present invention is to provide a light stabilizer that is not only capable of effectively rendering dyes lightfast, but also suitable for use as an additive that has high solubility in solvents and sufficiently good miscibility with dyes to insure that their solubility will not be impaired. A second object of the present invention is to use this light stabilizer for the purpose of preventing various reactions that cause deterioration by light in organic dyes, in particular cyanine dyes. A third object of the present invention is to use this light stabilizer for the purpose of improving the keeping quality and recording and reproduction characteristics of optical recording media that use organic dyes in the form of thin films.

Organic dyes fade or change in color upon exposure to light and the mechanism of these phenomena largely remains unclear because they involve the interaction between the structure of specific dyes and various environmental factors (e.g., substrate, the atmosphere, pollutants contained, humidity and temperature). General references on the mechanism of fading of dyes by light include a review by Charles H. Giles and Robert B. Mckay, "The Lightfastness of Dyes, A Review" in Textile Research Journal, Vol. 33, p. 527 (1963); Kitao, "Chemistry of Functional Dyes", p 65, CMC; and Akamatsu, Hirashima et al., "Applications of Photochemistry", p. 169, Kyoritsu Shuppan, but these references do not show explicitly the mechanism for the fading of cyanine dyes by light or the conditions for making them lightfast.

SUMMARY OF THE INVENTION

Under these circumstances, the present inventors conducted intensive studies based on the hypothesis that cyanine dyes would fade in color by exposure to light through photo degradation (radical decomposition), not through autoxidation. The present inventors screened various radical decomposition inhibitors and compounds that were expected to have comparable functions with a view to finding inhibitors or compounds that were effective in rendering cyanine dyes lightfast. As a result, a group of compounds that were very effective for this purpose were discovered. These compounds are specific types of aryl nitrogen compounds which can be characterized as aromatic compounds having at least one aryl group and at least one nitrogen atom which is not a hetero atom. These aryl nitrogen compounds can roughly be divided into two groups: (i) aryl nitroso compounds which include (a) nitrosoaniline derivatives, (b) nitrosophenols and their derivatives, (c) nitrosonaphthols and their derivatives, and (d) nitrosodiphenylamines and their derivatives; and (ii) 1-pycryl-2, 2-diarylhydrazyl free radicals.

DETAILED DESCRIPTION OF THE INVENTION (i) Aryl nitroso compounds (a) Typical nitrosoaniline derivatives that can be used effectively as the light stabilizer of the present invention an be represented by the following general formula (I):

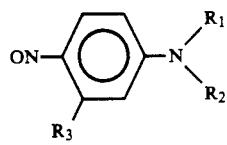

(where each of $R_1$ and $R_2$ represents the same or different group selected from the group consisting of a lower alkyl group (preferably a lower alkyl group containing 1–3 carbon atoms), a hydroxy lower alkyl group (preferably a hydroxy ethyl group) and $R_3$ is a group or atom selected from the group consisting of a hydroxyl group, a lower alkyl group (preferably a lower alkyl group having 1–3 carbon atoms), a halogen atom and a hydrogen atom)

Several specific examples of nitrosoaniline derivatives having the structure represented by the general formula (I) which can be used with particular advantage in the practice of the present inventions are listed below.

(1) N, N-Dimethyl-p-nitrosoaniline
(2) N, N-Diethyl-p-nitrosoaniline
(3) N, N-Dipropyl-p-nitrosoaniline
(4) N, N-Bis(2-hydroxyethyl)-p-nitrosoaniline
(5) N, N-Dimethyl-3-hydroxy-4-nitrosoaniline
(6) N, N-Dimethyl-3-chloro-4-nitrosoaniline
(7) N, N-Dimethyl-3-methyl-4-nitrosoaniline (b) Typical nitrosophenols and their derivatives that can be used effectively as the light stabilizer of the present invention can be represented by the general formula:

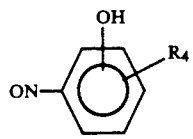

(where $R_4$ is a group or atom selected from the group consisting of a hydroxyl group, a lower alkyl group, preferably a lower alkyl group having 1–3 carbon atoms, a hydrogen atom and a halogen atom).

(c) Typical nitrosonaphthols and their derivatives that can be used affectively as the light stabilizer of the present invention can be represented by the general formula:

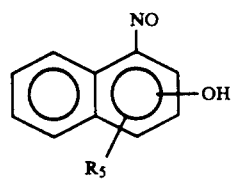

or the general formula:

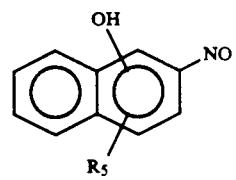

(where $R_5$ is a group or atom selected from the group consisting of a hydroxyl group, a lower alkyl group, preferably a lower alkyl group having 1–3 carbon atoms, a $—CONHC_6H_5$ group, a hydrogen atom and a halogen atom).

Several specific examples of nitrosophenols or their derivatives having the structure represented by the general formula (II) and nitrosonaphthols or their derivatives represented by the general formulas (III) and (IV) which can be used with particular advantage in the practice of the present inventions are listed below.
(B) Nitrosoresorcins inclusive of 2-nitrosoresorcin and 4-nitrosoresorcin
(9) 3-Nitroso-4-methylptrocatechol
(10) Nitroso-2-methylresorcin
(11) 4-Nitrosophenol
(12) Nitrosocresols inclusive of 6-nitroso-o-cresol and 4-nitroso-m-cresol
(13) 1-Nitroso-2-naphthol
(14) 2-Nitroso-1-naphthol
(15) 1-Nitroso-2-hydroxynaphthoic acid
(16) 1-Nitroso-Naphthol AS

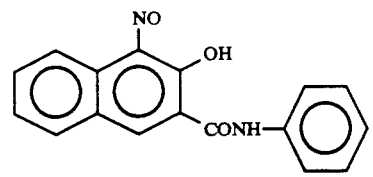

(d) Typical nitrosodiphenylamines and their derivatives that can be used effectively as the light stabilizer of the present invention an be represented by the general formula:

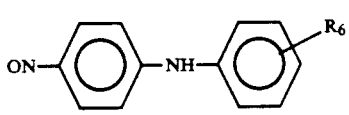

(where $R_6$ is one or more members selected from the group consisting of a lower alkyl group, a halogen atom, a nitro group, a carboxyl group, a cyano group, a hydroxyethyl group, an amino group, a hydroxyl group, an alkoxyl group, a trifluoroalkyl group, a sulfonic acid amide group and its derivatives, carboxylic acid amide group and its derivatives).

Several specific examples of nitrosodiphenylamine and its derivatives having the structure represented by the general formula (V) which can be used with particular advantage in the practice of the present inventions are listed below.
(17) 4-Nitrosodiphenylamine
(18) 4-Nitroso-2'-methyldiphenylamine
(19) 4-Nitroso-3'-methyldiphenylamine
(20) 4-Nitroso-4'-methyldiphenylamine
(21) 4-Nitroso-4'-methoxydiphenylamine
(22) 4-Nitroso-4'-ethoxydiphenylamine
(23) 4-Nitroso-4'-aminodiphenylamine
(24) 4-Nitroso-4'-dimethylaminodiphenylamine
(25) 4-Nitroso-4'-carboxydiphenylamine
(26) 4-Nitroso-4'-nitrodiphenylamine
(27) 4-Nitroso-4'-cyanodiphenylamine Some nitrosodiphenylamine derivatives represented by the general formula:

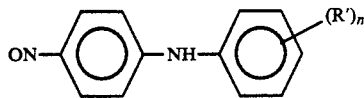

(where n is an integer of 1-3, preferably 1-2, and R' is the same or different member selected from the group consisting of a trifluoroalkyl group (whose alkyl has 1-2, preferably one carbon atom), a halogen atom (such as F, Cl, Br and I, most preferably I) and a nitro group) were found to be particularly useful for the intended purpose of the present invention.

Several specific examples of the nitrosodiphenylamine derivative s represented by the general formula (VI) are listed below under the reference number (28)–(49).

These nitrosodiphenylamine derivatives can be produced advantageously by reacting an aniline derivative represented by the following general formula (VII) with p-nitrosophenol in a lower alcohol such as methanol and ethanol in the presence of a catalyst such as diphosphorus pentoxide, the formula of said aniline derivative being:

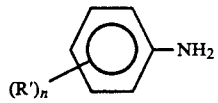

(where R' is one or two more substituents selected from the group consisting a halogen atom, a nitro group and a trifluoroalkyl group, and n is an integer of from 1 to 3). Examples of nitrosodiphenylamines are listed below.
(28) 4-Fluoro-4'-nitrosodiphenylamine
(29) 2-Chloro-4'-nitrosodiphenylamine
(30) 3-Chloro-4'-nitrosodiphenylamine
(31) 2-Bromo-4'-nitrosodiphenylamine
(32) 4-Bromo-4'-nitrosodiphenylamine
(33) 4-Iodo-4'-nitrosodiphenylamine
(34) 2-Trifluoromethyl-4'-nitrosodiphenylamine
(35) 3-Trifluoromethyl-4'-nitrosodiphenylamine
(36) 4-Trifluoromethyl-4'-nitrosodiphenylamine
(37) 4-Ethyl-4'-nitrosodiphenylamine
(38) 4-Isopropyl-4'-nitrosodiphenylamine
(39) 4-n-Butyl-4'-nitrosodiphenylamine
(40) 2, 4-Dichloro-4'-nitrosodiphenylamine
(41) 3, 4 Dichloro-4'-nitrosodiphenylamine
(42) 2, 4-Dibromo-4'-nitrosodiphenylamine
(43) 3, 5-Ditrifluoromethyl-4'-nitrosodiphenylamine
(44) 3-Chloro-4-methyl-4'-nitrosodiphenylamine
(45) 2-Methyl-5-nitro-4'-nitrosodiphenylamine
(46) 2-Chloro-4-nitro-4'-nitrosodiphenylamine
(47) 2-Chloro-5-nitro-4'-nitrosodiphenylamine
(48) 3-Nitro-4-Chloro-4'-nitrosodiphenylamine
(49) 2, 4, 5-Trichloro-4'-nitrosodiphenylamine Other nitrosodiphenylamines which can be used as the light stabilizer of the present invention are of the formula

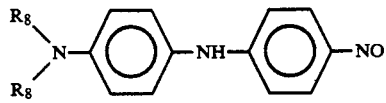

where $R_8$ is the same or different alkyl group of 1–4 carbon atoms.

A particularly preferred nitrosodiphenylamine compound is 4-N,N-diethylamine-4'-nitrosodiphenylamine of the formula:

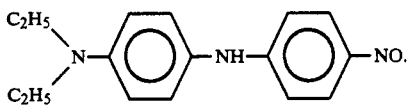

Other preferred nitrosodiphenylamines are as follows:
4-N,N-dimethylamine-4'-nitrosodiphenylamine,
4,N,N-dipropylamino-4'-nitrosodiphenylamine and
4-N,N-dibutylamine-4'-nitrosodiphenylamine.

(ii) 1-Pycryl-2, 2-diarylhydrazyl free radicals

Typical 1-pycryl-2, 2-diarylhydrazyl free radicals that can be used effectively as the light stabilizer of the present invention can be represented by the general formula:

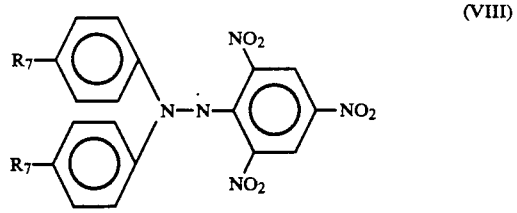

(where $R_7$ represents H, —COOCH$_3$ or —NO$_2$).

Among other known stable free radicals there are garbynoxyl; TEMPO and derivatives of these free radicals. None of them, however, were found to be effective as a light stabilizer.

Several specific examples of 1-pycryl-2, 2-diarylhydrazyl free radicals having the structure represented by the general formula (VIII) which can be used with particular advantage in the practice of the present inventions are listed below.

(50) 1-Pycryl-2, 2-diphenylhydrazyl

-continued

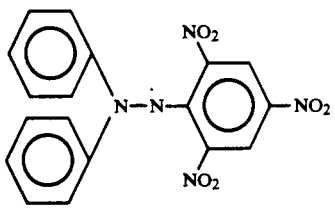

(51) 1-Pycryl-2, 2-bis (p-methyloxycarbonylphenyl) hydrazyl

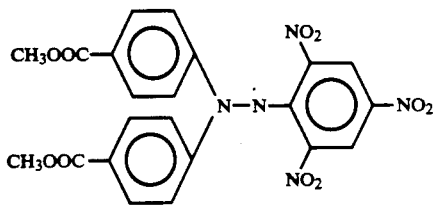

(52) 1-Pycryl-2, 2-bis (p-nitrophenyl) hydrazyl

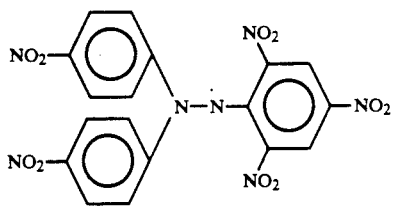

Any types of the above-mentioned light stabilizers comprised of an aryl nitrogen compound are used with particular organic materials to be rendered lightfast, and they may be used either on their own or as admixtures with one another.

The light stabilizers are generally used in amounts ranging from 0.01 to 1 mole per mole of light-vulnerable organic materials such as cyanine dyes but the amount of light stabilizers to be used In practice may be adjusted in accordance with the specific need. Preferably, the light stabilizers are used in amounts ranging from 0.1 to 1 mole per mole of cyanine dyes. The light stabilizers may be used in greater amounts but, natural as a consequence, the resulting color density will decrease and in some cases, the intended color density might fail to be attained. If the amount of light stabilizers used is unduly small, it sometimes occurs that the advantages of the present invention are not attained in a definite way.

Examples of light-vulnerable organic materials that can be rendered lightfast by the light stabilizers of the present invention include polymethine dyes, triarylmethane dyes, pyrylium dyes, phenanthrene dyes, tetradehydrocholine dyes, triarylamine dyes, squarylium dyes, croconic methine dyes, and merocyanine dyes. Cyanine dyes that are particularly suitable for use are indolenic cyanine dyes and thiazolic cyanine dyes. A more desirable cyanine dye is inodidicarbocyanine.

The present invention is described hereinafter with reference to examples which are given for illustrative purposes only and should not be taken as limiting. In the examples, a glass plate or polycarbonate (PC) plate was used as a substrate to be colored but it should be noted that comparable results can be attained with other substrates such as fibers, paper and films. In the examples, ethanol was used as a solvent to dissolve light stabilizers. Needless to say, other polar solvents can be used, but ethanol was selected since it was the best solvent in consideration of toxicity, volatility and corrosive action on the substrates.

EXAMPLE 1

To 100 parts by weight of stirred ethanol, 3.0 parts by weight of NK 242I (cyanine dye produced by Japanese Institute for Photosensitizing Dyes) and 1.0 part by weight of N, N-dimethyl-p-nitrosoaniline [the compound listed hereinabove under (1)] were successively added and the mixture was stirred at 20°-30° C. for 1 h. Subsequently, the mixture was subjected to filtration under gravity through Toyo Roshi No. 2 (qualitative filter paper) and the filtrate was spin-coated uniformly onto a glass plate. The maximum absorption wavelength ($\lambda$max) of the test piece was measured to determine a reference value. Thereafter, the coated surface of the test piece was exposed to light from a lamp (DR 400T of Irie Seisakusho Co., Ltd.), positioned 20 cm above. for periods of 3, 6 and 9 h, with the time of measurement of $\lambda$max being set as zero hour. After the exposure for the respective periods, the maximum absorption wavelength ($\lambda$max) of the test piece was measured and the percent fading of the cyanine dye was calculated from the reference and measured values. The results are shown in Table 1.

EXAMPLE 2

To 100 parts by weight of stirred ethanol, 3.0 parts by weight of NK 242i and 0.1 part by weight of N, N-dimethyl-p-nitrosoaniline were successively added and the mixture was stirred at 20°-30° C. for 1 h. The subsequent procedures were entirely the same as in Example 1 and the percent fading of the cyanine dye was calculated. The results are shown in Table 1.

COMPARATIVE EXAMPLE 1

To 100 parts by weight of stirred ethanol, 3.0 parts by weight of NK 2421 and 0.1 part by weight of N, N-dimethyl-p-nitroaniline were successively added and the mixture was stirred at 20°-30° C. for 1 h. The subsequent procedures were entirely the same as in Example 1 and the percent fading of the cyanine dye was calculated. The results are shown in Table 1.

EXAMPLE 3

To 100 parts by weight of stirred ethanol, 3.0 parts by weight of NK 1414 (cyanine dye produced by Japanese Institute for Photosensitizing Dyes) and 0.5 parts by weight of N, N-dietyl-p-nitrosoaniline [the compound listed hereinabove under (2)] were successively added and the mixture was stirred at 20°-30° C. for 1 h. The subsequent procedures were the same as in Example 1. The results are shown in Table 1.

EXAMPLE 4

To 100 parts by weight of stirred ethanol, 5.0 parts by weight of NK 1414 and 0.3 parts by weight of N, N-dimetyl-3-hydroxy-4-nitrosoaniline [the compound listed hereinabove under (5)] were successively added and the mixture was stirred at 20°-30° C. for 1 h. The subsequent procedures were the same as in Example 1. The results are shown in Table 1.

EXAMPLE 5

To 100 parts by weight of stirred ethanol, 5.0 parts by weight of NK 1414 and 0.5 parts by weight of N, N-dihydroxyethyl-p-nitrosoaniline [the compound listed hereinabove under (4)] were successively added and the mixture was stirred at 20°-30° C. for 1 h. The subsequent procedures were the same as in Example 1. The results are shown in Table 1.

COMPARATIVE EXAMPLE 2

To 100 parts by weight of stirred ethanol, 5.0 parts by weight of NK 1414 and 0.5 parts by weight of N, N-dimethyl-p-chloroaniline were successively added and the mixture was stirred at 20°-30° C. for 1 h. The subsequent procedures were entirely the same as in Example 1. The results are shown in Table 1.

EXAMPLE 6

To 100 parts by weight of stirred ethanol, 3.0 parts by weight of NK 2421 and 1.0 part by weight of N, N-dimethyl-p-nitrosoaniline [the compound listed hereinabove under (1)] were successively added and the mixture was stirred at 20°-30° C. for 1 h. The subsequent procedures were the same as in Example 1 except that the PC plate was used as a substrate. The results are shown in Table 1.

COMPARATIVE EXAMPLE 3

To 100 parts by weight of stirred ethanol, 3.0 parts by weight of NK 2421 was added and the mixture was stirred at 20°-30° C. for 1 h. The subsequent procedures were the same as in Example 1 except that no aniline derivative was used. The results are shown in Table 1.

COMPARATIVE EXAMPLE 4

To 100 parts by weight of stirred ethanol, 3.0 parts by weight of NK 1414 was added and the mixture was stirred at 20°-30° C. for 1 hour. The subsequent procedures were the same as in Example 1 except that no aniline derivative was used. The results are shown in Table 1.

The results of Examples 1–6 and Comparative Examples 1–4 are summarized in Table 1 in terms of the relationship between the duration of exposure to light and the percent fading of cyanine dye.

TABLE 1

| | Percent Fading of Cyanine Dye | | |
|---|---|---|---|
| | 3-h exposure | 6-h exposure | 9-h exposure |
| Example 1 | 5.0% | 7.2% | 8.5% |
| Example 2 | 8.7 | 13.1 | 15.0 |
| Example 3 | 6.2 | 8.7 | 10.3 |
| Example 4 | 9.0 | 11.3 | 13.0 |
| Example 5 | 4.7 | 6.2 | 7.7 |
| Example 6 | 5.1 | 7.2 | 8.4 |
| Comparative Example 1 | 25.6 | 30.0 | 39.4 |
| Comparative Example 2 | 25.7 | 30.2 | 40.2 |
| Comparative Example 3 | 25.2 | 30.1 | 39.0 |
| Comparative Example 4 | 25.0 | 30.0 | 38.3 |

As will be apparent from the experimental data shown in Table 1, the nitrosoaniline derivatives of the present invention provided outstanding results when they were used as light stabilizers. These compounds are highly soluble in organic solvents, so they are amenable to coating processes with the attendant potential advantage of large-scale production (see Examples 1 and 2). Comparison between Example 1 (where a glass plate was used as a substrate) and Example 6 (where a PC plate was used) shows that the difference in substrate caused only very small differences in the effectiveness of light stabilizers of the present invention, and that nitrosoaniline derivatives were effective in both cases. It is therefore expected that optical recording media of a type that uses thin films of organic dyes as recording layers and which are characterized by long keeping quality of the recording layers and good recording and reproduction characteristics can be manufactured by incorporating those derivatives as light stabilizers.

EXAMPLE 7

To 100 parts by weight of stirred ethanol, 3.0 parts by weight of NK 2421 (cyanine dye produced by Japanese Institute for Photosensitizing Dyes) and 1.0 part by weight of nitrosoresorcin [the compound listed hereinabove under (8)] were successively added and the mixture was stirred at 20°-30° C. for 1 h. Subsequently, the mixture was subjected to filtration under gravity through Toyo Roshi No. 2 (qualitative filter paper) and the filtrate was spin-coated uniformly onto a glass plate. The maximum absorption wavelength ($\lambda$max) of the tests piece was measured to determine a reference value. Thereafter, the coated surface of the test piece was exposed to light from a lamp (DR 400T of Irie Seisakusho Co., Ltd.). positioned 20 cm above, for periods of 3, 6 and 9 h, with the time of measurement of $\lambda$max being set as zero hour. After the exposure for the respective periods, the maximum absorption wavelength ($\lambda$max) of the test piece was measured and the percent fading of the cyanine dye was calculated from the reference and measured values. The results are shown in Table 2.

EXAMPLE 8

To 100 parts by weight of stirred ethanol, 3.0 parts by weight of NK 2421 and 0.1 part by weight of nitrosoresorcin were successively added and the mixture was stirred at 20°-30° C. for 1 h. The subsequent procedures were entirely the same as in Example 7 and the percent fading of the cyanine dye was calculated. The results are shown in Table 2.

COMPARATIVE EXAMPLE 5

To 100 parts by weight of stirred ethanol, 3.0 parts by weight of NK 2421 and 1.0 part by weight of resorcin were successively added and the mixture was stirred at 20°-30° C. for 1 h. The subsequent procedures were entirely the same as in Example 7 and the percent fading of the cyanine dye was calculated. The results are shown in Table 2.

EXAMPLE 9

The procedure of Example 7 was repeated to calculate the percent fading of cyanine dye except that the glass plate was replaced by a PC plate. The results are shown in Table 2.

EXAMPLE 10

To 100 parts by weight of stirred ethanol, 5.0 parts by weight of NK 1414 (cyanine dye produced by Japanese Institute for Photosensitizing Dyes) and 0.5 parts by weight of 3-nitroso-4-methylpyrocatechol [the compound listed hereinabove under (9)] were successively added and the mixture was stirred at 20°-30° C. for 1 h. The subsequent procedures were the same as in Example 7 except that the glass plate was replaced by a PC plate. The results are shown in Table 2.

EXAMPLE 11

To 100 parts by weight of stirred ethanol, 3.0 parts by weight of NK 1414 and 0.5 parts by weight of nitroso-2-methylresorcin [the compound listed hereinabove under (10)] were successively added and the mixture was stirred at 20°–30° C. for 1 h. The subsequent procedures were the same as in Example 10. The results are shown in Table 2.

EXAMPLE 12

An experiment was conducted and the percent fading of cyanine dye was calculated as in Example 10 except that NK 1414 was replaced by 3.0 parts by weight of NK 2421 and that 0.5 parts by weight of 1-nitroso-2-naphthol [the compound listed hereinabove under (13)] was used as a light stabilizer. The results are shown in Table 2.

EXAMPLE 13

An experiment was conducted and the percent fading of cyanine dye was calculated as in Example 10 except that NK 1414 was replaced by 3.0 parts by weight of NK 2421 and that 0.3 parts by weight of 2-nitroso-1-naphthol [the compound listed hereinabove under (14)] was used as a light stabilizer. The results are shown in Table 2.

EXAMPLE 14

An experiment was conducted and the percent fading of cyanine dye was calculated as in Example 10 except that NK 1414 was used in an amount of 3.0 parts by weight and that 0.3 parts by weight of 1-nitroso-2-hydroxynaphthoic acid [the compound listed hereinabove under (15)] was used as a light stabilizer. The results are shown in Table 2.

EXAMPLE 15

An experiment was conducted and the percent fading of cyanine dye was calculated as in Example 10 except that NK 1414 was replaced by 3.0 parts by weight of NK 2421 and that 0.3 parts by weight of 1-nitroso-Naphthol AS [the compound listed hereinabove under (16)] was used as a light stabilizer. The results are shown in Table 2.

COMPARATIVE EXAMPLE 6

To 100 parts by weight of stirred ethanol, 5.0 parts by weight of NK 1414 and 0.5 parts by weight of 4-methylpyrocatechol were successively added and the mixture was stirred at 20°–30° C. for 1 h. The subsequent procedures were entirely the same as in Example 10. The results are shown in Table 2.

COMPARATIVE EXAMPLE 7

An experiment was conducted and the percent fading of cyanine dye was calculated as in Example 11 except that the nitroso-2-methylresorcin was replaced by 2-methylresorcin. The results are shown in Table 2.

COMPARATIVE EXAMPLE 8

An experiment was conducted and the percent fading of cyanine dye was calculated as in Example 12 except that the 1-nitroso-2-naphthol was replaced by 2-naphthol. The results are shown in Table 2.

COMPARATIVE EXAMPLE 9

An experiment was conducted and the percent fading of cyanine dye was calculated as in Example 13 except that the 2-nitroso-1-naphthol was replaced by 1-naphthol. The results are shown in Table 2.

COMPARATIVE EXAMPLE 10

An experiment was conducted and the percent fading of cyanine dye was calculated as in Example 14 except that the 1-nitroso-2-hydroxynaphthoic acid was replaced by 2-hydroxynaphthoic acid. The results are shown in Table 2.

COMPARATIVE EXAMPLE 11

An experiment was conducted and the percent fading of cyanine dye was calculated as in Example 15 except that the 1-nitroso-Naphthol AS was replaced by Naphthol AS having the structure represented by the following formula:

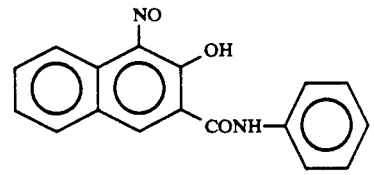

The results are shown in Table 2.

COMPARATIVE EXAMPLE 12

To 100 parts by weight of stirred ethanol, 3.0 parts by weight of NK 2421 was added and the mixture was stirred at 20°–30° C. for 1 h. The subsequent procedures were the same as in Example 7 except that neither a phenol derivative nor a naphtholic derivative was used. The results are shown in Table 2.

COMPARATIVE EXAMPLE 13

The procedure of Comparative Example 12 was repeated to calculate the percent fading of cyanine dye except that NK 1414 was used in place of NK 2421. The results are shown in Table 2.

COMPARATIVE EXAMPLE 14

To 100 parts by weight of stirred ethanol, 3.0 parts by weight of NK 2421 and 0.5 parts by weight of 2, 6-di-tert-butyl-4-methylphenol were successively added and the mixture was stirred at 20°–30° C. for 1 h. The subsequent procedures were the same as in Example 7. The results are shown in Table 2.

The results of Examples 7–15 and Comparative Examples 5–14 are summarized in Table 2 in terms of the relationship between the duration of exposure to light and the percent fading of cyanine dye.

TABLE 2

| | Percent Fading of Cyanine Dye | | |
|---|---|---|---|
| | 3-h exposure | 6-h exposure | 9-h exposure |
| Example 7 | 12.1% | 17.2% | 20.8% |
| Example 8 | 16.7 | 24.7 | 28.5 |
| Example 9 | 12.5 | 17.0 | 20.8 |
| Example 10 | 14.2 | 20.3 | 23.5 |
| Example 11 | 13.7 | 20.4 | 24.6 |
| Example 12 | 14.5 | 22.1 | 24.5 |
| Example 13 | 14.6 | 21.9 | 24.9 |
| Example 14 | 14.1 | 20.6 | 24.9 |
| Example 15 | 15.1 | 21.8 | 25.7 |
| Comparative | 24.1 | 30.0 | 39.0 |

TABLE 2-continued

| | Percent Fading of Cyanine Dye | | |
|---|---|---|---|
| | 3-h exposure | 6-h exposure | 9-h exposure |
| Example 5 Comparative Example 6 | 24.0 | 30.2 | 38.1 |
| Comparative Example 7 | 24.1 | 30.0 | 38.2 |
| Comparative Example 8 | 24.0 | 30.1 | 39.0 |
| Comparative Example 9 | 24.0 | 30.1 | 39.1 |
| Comparative Example 10 | 24.0 | 30.1 | 38.3 |
| Comparative Example 11 | 24.1 | 30.0 | 39.0 |
| Comparative Example 12 | 25.2 | 30.1 | 39.0 |
| Comparative Example 13 | 25.0 | 30.3 | 38.3 |
| Comparative Example 14 | 24.0 | 30.5 | 40.7 |

As will be apparent from the experimental data shown in Table 2, the nitrosophenol or nitrosonaphthol derivatives of the present invention provided outstanding results when they were used as light stabilizers. These compounds are highly soluble in organic solvents, particularly in general-purpose polar organic solvents, so they are amenable to coating processes with the attendant potential advantage of large-scale production (see Examples 7 and 8). Comparison between Example 7 (where a glass plate was used as a substrate) and Example 9 (where a PC plate was used) shows that the difference in substrate caused only very small differences in the effectiveness of light stabilizers of the present invention, and that nitrosophenol or nitrosonaphthol derivatives were effective in both cases. It is therefore expected that optical recording media of a type that uses thin films of organic dyes as recording layers and which are characterized by long keeping quality of the recording layers and good recording and reproduction characteristics can be manufactured by incorporating those derivatives as light stabilizers.

EXAMPLE 16

To 100 parts by weight of stirred ethanol, 3.0 parts by weight of NK 2421 (cyanine dye produced by Japanese Institute for Photosensitizing Dyes) and 1.0 part by weight of 4-nitroso-diphenylamine [the compound listed hereinabove under (17)] were successively added and the mixture was stirred at 20°–30° C. for 1 h. Subsequently, the mixture was subjected to filtration under gravity through Toyo Roshi No. 2 (qualitative filter paper) and the filtrate was spin-coated uniformly onto a glass plate. The maximum absorption wavelength (λmax) of the tests piece was measured to determine a reference value. Thereafter the coated surface of the test piece was exposed to light from a lamp (DR 400T of Irie Seisakusho Co., Ltd.), positioned 20 cm above, for periods of 3, 6 and 9 h, with the time of measurement of λmax being set as zero hour. After the exposure for the respective periods, the maximum absorption wavelength (λmax) of the test piece was measured and the percent fading of the cyanine dye was calculated from the reference and measured values. The results are shown in Table 3.

EXAMPLE 17

To 100 parts by weight of stirred ethanol, 3.0 parts by weight of NK 2421 and 0.1 part by weight of 4-nitrosodiphenylamine were successively added and the mixture was stirred at 20°–30° C. for 1 h. The subsequent procedures were entirely the same as in Example 16 and the percent fading of the cyanine dye was calculated. The results are shown in Table 3.

COMPARATIVE EXAMPLE 15

To 100 parts by weight of stirred ethanol, 3.0 parts by weight of NK 2421 and 1.0 part by weight of diphenylamine were successively added and the mixture was stirred at 20°–30° C. for 1 h. The subsequent procedures were entirely the same as in Example 16 and the percent fading of the cyanine dye was calculated.. The results are shown in Table 3.

EXAMPLE 18

To 100 parts by weight of stirred ethanol, 3.0 parts by weight of NK 1414 (cyanine dye produced by Japanese Institute for Photosensitizing Dyes) and 0.3 parts by weight of 4-nitroso-4'-methyldiphenylamine [the compound listed hereinabove under (20)] were successively added and the mixture was stirred at 20°–30° C. for 1 h. The subsequent procedures were entirely the same as in Example 16 except that a PC plate was used as a substrate. The results are shown in Table 3.

EXAMPLE 19

To 100 parts by weight of stirred ethanol, 3.0 parts by weight of NK 1414 and 0.5 parts by weight of 4-nitroso-4'-methoxydiphenylamine [the compound listed hereinabove under (21)] were successively added and the mixture was stirred at 20°–30° C. for 1 h. The subsequent procedures were the same as in Example 18. The results are shown in Table 3.

EXAMPLE 20

To 100 parts by weight of stirred ethanol, 5.0 parts by weight of NK 1414 and 2.0 parts by weight of 4-nitroso-4'-methyldiphenylamine [the compound listed hereinabove under (20)] were successively added and the mixture was stirred at 20°–30° C. for 1 h. The subsequent procedures were the same as in Example 18. The results are shown in Table 3.

EXAMPLE 21

To 100 parts by weight of stirred ethanol, 4.0 parts by weight of NK 3219 (cyanine dye produced by Japanese Institute for Photosensitizing Dyes) and 1.0 part by weight of 4-nitroso-4'-carboxydiphenylamine [the compound listed hereinabove under (25)] were successively added and the mixture was stirred at 20°–30° C. for 1 h. The subsequent procedures were entirely the same as in Example 18. The results are shown in Table 3.

COMPARATIVE EXAMPLE 16

To 100 parts by weight of stirred ethanol 3.0 parts by weight of NK 2421 and 0.5 parts by weight of PA 1006 (nickel complex produced by Mitsuitoatsu Fine Co.. Ltd.) were successively added and the mixture was stirred at 20°–30° C. for 1 h. It was observed that a substantial amount of the dye remained undissolved The subsequent procedures were the same as in Example 18. The results are shown in Table 3.

COMPARATIVE EXAMPLE 17

To 100 parts by weight of stirred ethanol, 3.0 parts by weight of NK 2421 was added and the mixture was stirred at 20°–30° C. for 1 h. The subsequent procedures were the same as in Example 18 except that no diphenylamine derivative was used. The results are shown in Table 3.

COMPARATIVE EXAMPLE 18

To 100 parts by weight of stirred ethanol, 3.0 parts by weight of NK 1414 was added and the mixture was stirred at 20°–30° C. for 1 h. The subsequent procedures were the same as in Example 18 except that no diphenylamine derivative was used. The results are shown in Table 3.

COMPARATIVE EXAMPLE 19

To 100 parts by weight of stirred ethanol, 3.0 parts by weight of NK 1414 and 1.0 part by weight of diphenylamine were added and the mixture was stirred at 20°–30° C. for 1 h. The subsequent procedures were the same as in Example 18. The results are shown in Table 3.

COMPARATIVE EXAMPLE 20

To 100 parts by weight of stirred ethanol, 3.0 parts by weight of NK 3219 was added and the mixture was stirred at 20°–30° C. for 1 h. The subsequent procedures were the same as in Example 18 except that no diphenylamine derivative was used. The results are shown in Table 3.

COMPARATIVE EXAMPLE 21

To 100 parts by weight of stirred ethanol, 3.0 parts by weight of NK 3219 and 1.0 part by weight of diphenylamine were successively added and the mixture was stirred at 20°–30° C. for 1 h. The subsequent procedures were entirely the same as in Example 18. The results are shown in Table 3.

The results of Examples 16–21 and Comparative Examples 15–21 are summarized in Table 3 in terms of the relationship between the duration of exposure to light and the percent fading of cyanine dye

TABLE 3

| | Percent Fading of Cyanine Dye | | |
|---|---|---|---|
| | 3-h exposure | 6-h exposure | 9-h exposure |
| Example 16 | 5.0% | 6.2% | 7.5% |
| Example 17 | 7.1 | 8.7 | 10.0 |
| Example 18 | 6.2 | 7.1 | 8.9 |
| Example 19 | 4.8 | 5.9 | 7.2 |
| Example 20 | 2.0 | 3.1 | 4.1 |
| Example 21 | 4.2 | 5.8 | 7.2 |
| Comparative Example 15 | 24.0 | 29.7 | 38.5 |
| Comparative Example 16 | 15.8 | 28.0 | 38.2 |
| Comparative Example 17 | 25.2 | 30.1 | 39.0 |
| Comparative Example 18 | 25.0 | 30.3 | 38.3 |
| Comparative Example 19 | 24.8 | 29.8 | 38.5 |
| Comparative Example 20 | 17.8 | 24.5 | 29.0 |
| Comparative Example 21 | 17.5 | 24.0 | 29.2 |

A will be apparent from the experimental data shown in Table 3, the nitrosodiphenylamine derivatives of the present invention provided outstanding results when they were used as light stabilizers. These compounds are highly soluble in organic solvents, particularly in general-purpose polar organic solvents, so they are amenable to coating processes with the attendant potential advantage of large-scale production (see Examples 16 and 17). Comparison between Example 16 (where a glass plate was used as a substrate) and Example 18 (where a PC plate was used) shows that the difference in substrate caused only very small differences in the effectiveness of light stabilizers of the present invention, and that nitrosodiphenylamine derivatives were effective in both cases. It is therefore expected that optical recording media of a type that uses thin films of organic dyes as recording layers and which are characterized by long keeping quality of the recording layers and good recording and reproduction characteristics can be manufactured by incorporating those derivatives as light stabilizers.

EXAMPLE 22

An example of a process for producing 4-fluoro-4'-nitrosodiphenylamine [the compound listed hereinbefore under (28)] is given below.

In 150 ml of methanol, 12.3 g (1/10 mole) of p-nitrosophenol was dissolved at room temperature. Then, 2.5 g of p-toluensolfonic acid dihydrate was added to the mixture and it was agitated at 20°–50° C. After 1 h. of agitation 11.1 g (1/10 mole) of p-fluoroaniline was put into the mixture, which was heated to 30°–35° C. with agitation. After 2 hs. of agitation an aqueous solution comprising 1.0 g of sodium hydrogencarbonate dissolved in 150 ml of ion-exchange purified water was added to said mixture, which was agitated. The product precipitated from the solution after 1 h. of agitation was separated from the solution through filtration by means of suction and was purified by recrystallization from ethanol.

This purified product was observed to have a melting point in the range of 183°–185° C. The product was obtained in an amount of 5.2 g (in a 24.1% Yield).

From the value of the elemental analysis and the result of spectral analysis the molecular formula of this compound was determined to be $C_{12}H_9ON_2F$. The comparison of the calculated and the measured values is as shown in Table 4 below.

TABLE 4

| | Calculated Value (%) | Measured Value (%) |
|---|---|---|
| C | 66.66 | 66.51 |
| H | 4.20 | 4.21 |
| N | 12.96 | 13.00 |

EXAMPLE 23

An example of a process for producing 4-bromo-4'-nitrosodiphenylamine [the compound listed hereinbefore under (32)] is given below.

Procedures given in Example 22 were repeated except that 17.2 g of p-bromoaniline was used substituting for 11.1 g of p-fluoroaniline used in Example 22, and the following purified product was obtained. This compound was found to have a melting point in the range of 159°–161° C. and was obtained in an amount of 10.2 g (in a 37.5% Yield). From the value of the elemental analysis and the result of the spectral analysis the molecular formula of this compound was determined to be $C_{12}H_9ON_2Br$. The comparison of the calculated and the measured values is as given in Table 5 below.

TABLE 5

| | Calculated Value (%) | Measured Value (%) |
|---|---|---|
| C | 52.01 | 52.12 |
| H | 3.28 | 3.29 |
| N | 10.11 | 10.53 |

EXAMPLE 24

An example of a process for producing 4-iodo-4'-nitrosodiphenylamine [the compound listed hereinbefore under (33)] is given below.

In 200 ml of ethanol, 12.3 g (1.10 mole) of p-nitrosophenol was dissolved at room temperature. Then, 1.4 g (1/100 mole) of diphosphorus pentoxide was added thereto and the resulting mixture was agitated at 20°–25° C. After 1 h. of agitation 21.9 g (1/10 mole) of p-iodoaniline was put into it and the mixture was heated to 30°–35° C. for 2 hs. with agitation. After 2 hs. of agitation the solution was cooled (to 10°–20° C.) and the precipitated product was filtered by means of suction. The solid product was washed with water and was purified by recrystallization from ethanol. The purified product was found to have a melting point in the range of 146°–147° C. and was obtained in an amount of 21.5 g (in a 66.4% yield).

From the value of the elemental analysis and the result of the spectral analysis the molecular formula of this product was found to be $C_{12}H_9ON_2I$. The comparison of the calculated and the measured values is as shown in Table 6 below.

TABLE 6

| | Calculated Value (%) | Measured Value (%) |
|---|---|---|
| C | 44.47 | 44.26 |
| H | 2.80 | 2.91 |
| N | 8.65 | 8.73 |

EXAMPLE 25

Another example of a process for producing 4-iodo-4'-nitrosodiphenylamine [the compound listed hereinabove under (33)] is given below.

The procedures as in Example 24 were repeated except that 2.5 g of p-toluensulfonic acid dihydrate was used substituting for 1.4 g of diphosphorus pentoxide in Example 24. A compound having a melting point in the range of 157°–158° C. was obtained in an amount of 10.5 g (in a 32.4% Yield). It was confirmed by the mixed examination that this compound had the melting point in the range of 157°–158° C. and was the same material as the product obtained in Example 24.

EXAMPLE 26

An example of a process for producing 4-trifluoromethyl-4'-nitrosodiphenylamine [the compound listed hereinbefore under (36)] is given below.

The procedures as in Example 24 were repeated except that 11.1 g (1/10 mole) of p-trifluoromethylaniline was used substituting for 21.9 g of p-iodoaniline used in Example 24. The product having a melting point in the range of 183°–185° C. was obtained in an amount of 15.2 g (in a 57.1% yield).

From the value of the elemental analysis and the result of the spectral analysis the molecular formula of this product was determined to be $C_{13}H_9ON_2F_3$. The comparison of the calculated and the measured values is as shown in Table 7 below.

TABLE 7

| | Calculated Value (%) | Measured Value (%) |
|---|---|---|
| C | 58.65 | 58.72 |
| H | 3.41 | 3.40 |
| N | 10.53 | 10.69 |

EXAMPLE 27–43

A number of various novel nitrosodiphenylamine derivatives listed hereinbefore under (28)–(49) were prepared by the procedures similar to those as in Examples 22 and 25. Results of the measurements for determining the melting points and the values of the elemental analysis of these derivatives are given in Table 8.

With respect to each of the nitrosodiphenylamine derivatives of the present invention the maximum absorption wavelength ($\lambda$max) and molecular absorption coefficient ($\epsilon$) were measured [measuring instruments: U-3210 type self-recording spectrophotometer produced by Hitachi Manufacturing Co., Ltd.; Solvent: ethanol (special grade chemical)]. The measurements are given in Table 9.

TABLE 8

| Example No. | Compound No. | Nitrosodiphenylamine Derivative | Melting Point (°C.) | Calculated C | Calculated H | Calculated N | Measured C | Measured H | Measured N |
|---|---|---|---|---|---|---|---|---|---|
| 27 | 29 | 2-Chloro-4'-nitrosodiphenylamine | 128–129 | 61.93 | 3.91 | 12.04 | 62.01 | 3.92 | 12.01 |
| 28 | 30 | 3-Chloro-4'-nitrosodiphenylamine | 147–149 | 61.93 | 3.91 | 12.04 | 61.87 | 3.90 | 12.11 |
| 29 | 31 | 2-Bromo-4'-nitrosodiphenylamine | 123–125 | 52.01 | 3.28 | 10.11 | 52.22 | 3.31 | 10.05 |
| 30 | 34 | 2-Trifluoromethyl-4'-nitrosodiphenylamine | 105–106 | 58.65 | 3.41 | 10.53 | 58.55 | 3.49 | 10.50 |
| 31 | 35 | 3-Trifluoromethyl-4'-nitrosodiphenylamine | 150–151 | 58.65 | 3.41 | 10.53 | 58.73 | 3.52 | 10.52 |
| 32 | 37 | 4-Ethyl-4'-nitrosodiphenylamine | 111–115 | 76.53 | 6.25 | 12.38 | 76.52 | 6.33 | 12.40 |
| 33 | 38 | 4-Isopropyl-4'-nitrosodiphenylamine | 112–113 | 74.97 | 6.72 | 11.66 | 74.79 | 6.59 | 11.78 |
| 34 | 39 | 4-n-Butyl-4'-nitrosodiphenylamine | 89–91 | 75.53 | 7.15 | 11.01 | 75.50 | 7.22 | 11.04 |
| 35 | 40 | 2, 4-Dichloro-4'-nitrosodiphenylamine | 143–144 | 53.93 | 3.03 | 10.49 | 54.01 | 3.02 | 10.52 |
| 36 | 41 | 3, 4-dichloro-4'-nitrosodiphenylamine | 188–189 | 53.96 | 3.03 | 10.49 | 54.13 | 3.11 | 10.46 |

TABLE 8-continued

| Example No. | Compound No. | Nitrosodiphenylamine Derivative | Melting Point (°C.) | Value of Elemental Analysis (%) Caluculated | | | Measured | | |
|---|---|---|---|---|---|---|---|---|---|
| | | | | C | H | N | C | H | N |
| 37 | 42 | 2, 4-Dibromo-4'-nitrosodiphenylamine | 135–136 | 40.48 | 2.27 | 7.87 | 40.44 | 2.29 | 7.85 |
| 38 | 43 | 3, 5-Ditrifluoromethyl-4'-nitrosodiphenylamine | 158–159 | 50.31 | 2.42 | 8.38 | 50.32 | 2.40 | 8.40 |
| 39 | 44 | 3-Chloro-4-methyl-4'-nitrosodiphenylamine | 164–165 | 63.29 | 4.50 | 11.36 | 63.17 | 4.62 | 11.33 |
| 40 | 45 | 2-Methyl-5-nitro-4'-nitrosodiphenylamine | 163–164 | 60.68 | 4.32 | 10.89 | 60.70 | 4.30 | 10.71 |
| 41 | 46 | 2-Chloro-4-nitro-4'-nitrosodiphenylamine | 175–176 | 51.90 | 2.91 | 15.14 | 51.77 | 2.89 | 15.15 |
| 42 | 48 | 3-Nitro-4-chloro-4'-nitrosodiphenylamine | 197 | 51.90 | 2.91 | 15.14 | 51.83 | 2.79 | 15.09 |
| 43 | 49 | 2, 4, 5-Trichloro-4'-nitrosodiphenylamine | 161–162 | 47.79 | 2.34 | 9.29 | 47.82 | 2.35 | 9.30 |

TABLE 9

| Compound No. | Nitrosodiphenylamine Derivative | λmax (nm) | $\epsilon (\times 10^4)$ |
|---|---|---|---|
| 28 | 4-Fluoro-4'-nitrosodiphenylamine | 417 | 2.80 |
| 29 | 2-Chloro-4'-nitrosodiphenylamine | 408 | 2.69 |
| 30 | 3-Chloro-4'-nitrosodiphenylamine | 415 | 2.58 |
| 31 | 2-Bromo-4'-nitrosodiphenylamine | 407 | 2.74 |
| 32 | 4-Bromo-4'-nitrosodiphenylamine | 420 | 3.03 |
| 33 | 4-Iodo-4'-nitrosodiphenylamine | 422 | 3.15 |
| 34 | 2-Trifluoromethyl-4'-nitrosodiphenylamine | 402 | 2.45 |
| 35 | 3-Trifluoromethyl-4'-nitrosodiphenylamine | 413 | 2.95 |
| 36 | 4-Trifluoromethyl-4'-nitrosodiphenylamine | 413 | 3.07 |
| 37 | 4-Ethyl-4'-nitrosodiphenylamine | 426 | 2.57 |
| 38 | 4-Isopropyl-4'-nitrosodiphenylamine | 427 | 2.90 |
| 39 | 4-n-Butyl-4'-nitrosodiphenylamine | 427 | 2.95 |
| 40 | 2, 4-Dichloro-4'-nitrosodiphenylamine | 405 | 2.76 |
| 41 | 3, 4-Dichloro-4'-nitrosodiphenylamine | 413 | 3.03 |
| 42 | 2, 4-Dibromo-4'-nitrosodiphenylamine | 404 | 2.80 |
| 43 | 3, 5-Ditrifluoromethyl-4'-nitrosodiphenylamine | 400 | 3.00 |
| 44 | 3-Chloro-4-methyl-4'-nitrosodiphenylamine | 420 | 2.96 |
| 45 | 2-Methyl-5-nitro-4'-nitrosodiphenylamine | 402 | 2.77 |
| 47 | 2-Chloro-5-nitro-4'-nitrosodiphenylamine | 396 | 1.98 |
| 48 | 3-Nitro-4-chloro-4'-nitrosodiphenylamine | 409 | 3.02 |
| 49 | 2, 4, 5-Trichloro-4'-nitrosodiphenylamine | 400 | 2.45 |

Now, reference will be made to the inventions of uses. The inventions of uses are mainly directed to materials such as rubber, plastics, dyes or the like to which the novel 4'-nitrosodiphenylamine derivatives have been added to be admixed uniformly with each other. They are also directed to materials such as rubber, plastics, dyes or the like on which said derivatives have been coated in these oases the light stabilizers are used in an amount in the range of 0.001-50 parts (by weight) per 100 parts of the specific rubber, plastics, dye or the like to which the light stabilizer is to be added. Preferably the light stabilizer should be added in an amount of 0.01-30 parts based on the same standard as mentioned above. In the specification the advantage of the invention is explained mainly by reference to the effectiveness of the light stabilizer of the present invention when it is used incorporated in the cyanine dyes used as an important component of the optical recording medium. It will be understood, however, that the embodiments of the present invention should not be limited to such examples. The term "part(s)" as appeared in the following examples is used &o mean "part(s) by weight".

EXAMPLE 44

To 100 parts by weight of stirred ethanol, 3.0 parts by weight of NK 2421 (cyanine dye produced by Japanese Institute for Photosensitizing Dyes) and 1.0 part by weight of 4-fluoro-4'-nitrosodiphenylamine [the compound listed hereinabove under (28)] were successively added and the mixture was stirred at 20°-30° C. for 1 h Subsequently, the mixture was subjected to filtration under gravity through Toyo Roshi No. 2 (qualitative filter paper) and the filtrate was spin-coated uniformly onto a glass plate.

Light resistance test was conducted by using Atlas Fade-Ometer CI35F1 (Xenon arc 6500W) produced by Toyo Seikiseisakusho Co., Ltd.

A reference value was determined in accordance with JIS L0841 by simultaneously irradiating Blue Scale A based on the First Exposure Method (Day-and-Night Method).

As a result of the sun-light test (First Exposure Method) or the Day-and-Night Method, the light resistance of the test piece was determined to be the second grade.

COMPARATIVE EXAMPLE 22

All the procedures as in Example 44 were repeated except that the addition of 4-fluoro-4'-nitrosodiphenylamine was omitted.

As a result of the sun-light test (First Exposure Method) or the Day-and-Night Method, the light resistance of the test piece was determined to be less than the first grade.

EXAMPLE 45

To 100 parts by weight of stirred ethanol, 3.0 parts by weight of NK 3219 (cyanine dye produced by Japanese Institute for photosensitizing Dyes) and 0.5 parts by weight of 4-iodo-4'-nitrosodiphenylamine [the compound listed hereinbefore under (33)] were successively added and the mixture stirred at 20°-30° C. for 1 h.

Subsequently, the mixture was subjected to filtration under gravity through Toyo Roshi No. 2 (qualitative filter paper) and the filtrate was spin-coated onto a polycarbonate plate. The test piece thus obtained was subjected to the test for determining light resistance according to the procedures as in Example 22.

As a result of the sun-light test (First Exposure Method) or the Day-and-Night Method, the light resistance of the test piece was determined to be in the range of the second to the third grade.

COMPARATIVE EXAMPLE 23

An experiment was conducted according to the same procedures as in Example 44 except 0.5 parts of diphenylamine was used substituting for 0.5 parts of 4-iodo-4'-nitrosodiphenylamine.

As a result of the sun-light test (First Exposure Method) or the Day-and-Night Method, the light resistance of the test piece was determined to be less than the first grade.

EXAMPLE 46

An experiment was conducted according to the same procedures as in Example 44 except that 1.5 parts of 4-trifluoromethyl-4'-nitrosodiphenylamine was used substituting for 0.5 parts of 4-iodo-4'-nitrosodiphenylamine used in Example 44.

As a result of the sun-light test (First Exposure Method) or the Day-and-Night Method, the light resistance of the test piece was determined to be the third grade.

As will be apparent from the experimental data shown in Examples, the nitrosodiphenylamine derivatives of the present invention provided outstanding results when they were used as light stabilizers. These compounds are highly soluble in organic solvents, particularly in general-purpose polar organic solvents, so they are amenable to coating processes with the attendant potential advantage of large-scale production. Comparison between Example 44 (where a glass plate was used as a substrate) and Example 45 (where a plastics plate was used) shows that the difference in substrate caused only very small differences in the effectiveness of light stabilizers of the present invention, and that nitrosodiphenylamine derivatives were effective in both oases. It is therefore expected that optical recording media of a type that uses thin films of organic dyes as recording layers and which are characterized by long keeping quality of the recording layers and good recording and reproduction characteristics can be manufactured by incorporating those derivatives as light stabilizers.

EXAMPLE 47

To 100 parts by weight of stirred ethanol, 3.0 parts by weight of NK 2421 (cyanine dye produced by Japanese Institute for photosensitizing Dyes) and 1.0 part by weight of 1-pycryl-2, 2-diphenylhydrazyl (DPPH) [the free radical listed hereinabove under (50)] were successively added and the mixture was stirred at 20°–30° C. for 1 h. Subsequently, the mixture was subjected to filtration under gravity through Toyo Roshi No. 2 (qualitative filter paper) and the filtrate was spin-coated uniformly onto a glass plate. The maximum absorption wavelength (λmax) of the tests piece was measured to determine a reference value. Thereafter, the coated surface of the test piece was exposed to light from a lamp (DR 400T of Irie Seisakusho Co., Ltd.), positioned 20 cm above, for periods of 3, 6 and 9 h, with the time of measurement of λmax being set as zero hour. After the exposure for the respective periods, the maximum absorption wavelength (λmax) of the test piece was measured and the percent fading of the cyanine dye was calculated from the reference and measured values. The results are shown in Table 10.

EXAMPLE 48

To 100 parts by weight of stirred ethanol, 3.0 parts by weight of NK 2421 and 0.1 part by weight of DPPH were successively added and the mixture was stirred at 20°–30° C. for 1 h. The subsequent procedures were entirely the same as in Example 47 and the percent fading of the cyanine dye was calculated. The results are shown in Table 10.

COMPARATIVE EXAMPLE 24

To 100 parts by weight of stirred ethanol, 3.0 parts by weight of NK 2421 was added and the mixture was stirred at 20°–30° C. for 1 h. The subsequent procedures were entirely the same as in Example 47 and the percent fading of the cyanine dye was calculated. The results are shown in Table 10.

EXAMPLE 49

To 100 parts by weight of stirred ethanol, 3.0 parts by weight of NK 1414 (cyanine dye produced by Japanese Institute for Photosensitizing Dyes) and 0.3 parts by weight of DPPH were successively added and the mixture was stirred at 20°–30° C. for 1 h. The subsequent procedures were entirely the same as in Example 47. The results are shown in Table 10.

EXAMPLE 50

The procedures of Example 49 were repeated to calculate the percent fading of cyanine dye except that the glass plate was replaced by a PC plate. The results are shown in Table 10.

COMPARATIVE EXAMPLE 25

To 100 parts by weight of stirred ethanol, 3.0 parts by weight of NK 1414 was added and the mixture was stirred at 20°–30° C. for 1 h The subsequent procedures were the same as in Example 49. The results are shown in Table 10.

EXAMPLE 51

To 100 parts by weight of stirred ethanol, 5.0 parts by weight of NK 3219 (cyanine dye produced by Japanese Institute for Photosensitizing Dyes) and 1.0 part by weight of DPPH were successively added and the mixture was stirred at 20°–30° C. for 1 h. The subsequent procedures were entirely the same as in Example 50. The results are shown in Table 10.

COMPARATIVE EXAMPLE 26

To 100 parts by weight of stirred ethanol, 5.0 parts by weight of NK 3219 was added and the mixture was stirred at 20°–30° C. for 1 h. The subsequent procedures were the same as in Example 51. The results are shown in Table 10.

EXAMPLE 52

To 100 parts by weight of stirred ethanol 3.0 parts by weight of NK 3219 and 0.3 parts by weight of 1-pycryl-2, 2-bis (p-methyloxycarbonylphenyl] hydrazyl [the free radical listed hereinabove under (51)] were successively added and the mixture was stirred at 20°-30° C. for 1 h. The subsequent procedures were the same as in Example 51. The results are shown in Table 10.

COMPARATIVE EXAMPLE 27

An experiment was conducted and the percent fading of cyanine dye was calculated as in Example 51 except that garbynoxyl was used as a free radical. The results are shown in Table 10.

The results of Examples 47-52 and Comparative Examples 24-27 are summarized in Table 10 in terms of the relationship between the duration of exposure to light and the percent fading of cyanine dye.

TABLE 10

|  | Percent Fading of Cyanine Dye | | |
|---|---|---|---|
|  | 3-h exposure | 6-h exposure | 9-h exposure |
| Example 47 | 12.7% | 20.1% | 26.5% |
| Example 48 | 15.2 | 25.7 | 35.0 |
| Example 49 | 13.8 | 22.5 | 31.2 |
| Example 50 | 13.7 | 22.6 | 31.2 |
| Example 51 | 11.5 | 18.1 | 20.0 |
| Example 52 | 17.0 | 21.5 | 24.2 |
| Comparative Example 24 | 25.2 | 30.1 | 39.0 |
| Comparative Example 25 | 25.0 | 30.3 | 38.3 |
| Comparative Example 26 | 17.8 | 24.5 | 29.0 |
| Comparative Example 27 | 16.5 | 24.0 | 29.0 |

A will be apparent from the experimental data shown in Table 10, the 1-pycryl-2, 2-diarylhydrazyl free radicals of the present invention provided outstanding results when they were used as light stabilizers. These free radicals are highly soluble in organic solvents, so they are amenable to coating processes with the attendant potential advantage of large-scale production (see Examples 47 and 48). Comparison between Example 49 (where a glass plate was used as a substrate) and Example 50 (where a plastic plate was used) shows that the difference in substrate caused only very small differences in the effectiveness of light stabilizers of the present invention, and that 1-pycryl-2, 2-diarylhydrazyl free radicals were effective in both cases. It is therefore expected that optical recording media of a type that uses thin films of organic dyes as recording layers and which are characterized by long keeping quality of the recording layers and good recording and reproduction characteristics can be manufactured by incorporating those free radicals as light stabilizers.

EXAMPLE 53

An example of a process for producing 4-N,N-diethylamino-4'-nitrosodiphenylamine is given below.

In 150 ml of methanol, 12.3 g (1/10 mole) of p-nitrosophenol was dissolved at room temperature. Then, 2.5 g of p-toluenesolfonic acid dihydrate was added to the mixture and it was agitated at 20° to 50° C. After 1 hour of agitation 15.0 g (1/10 mole) of N,N-diethyl-p-phenylenediamine was put into the mixture, which was heated to 30° to 35° C. with agitation. After 2 hours of agitation 150 ml of an aqueous solution comprising 1.0 g of sodium hydrogencarbonate dissolved in 150 ml of ion-exchange purified water was added to said mixture, which was agitated. The product precipitated from the solution after 1 hour of agitation was separated from the solution through filtration by means of suction and was purified by recrystallization from ethanol.

This purified product was observed to have a melting point in the range of 128° to 129° C. The product was obtained in an amount of 17.0 g (in a 66.6% yield).

From the value of the elemental analysis and the result of spectral analysis the molecular formula of this compound was determined to be $C_{156}H_{18}ON_2$. The comparison of the calculated and the measured values is as follows.

|  | Calculated Value (%) | Measured Value (%) |
|---|---|---|
| C | 71.33 | 71.30 |
| H | 7.12 | 7.20 |
| N | 15.60 | 15.50 |

With respect to the above nitrosodiphenylamine derivative of the present invention the maximum absorption wavelength ($\lambda$max) and molecular absorption coefficient ($\epsilon$) were measured [measuring instruments: U-3210 type self-recording spectrophotometer produced by Hitachi Manufacturing Co., Ltd.; Solvent: ethanol (special grade chemical)]. The measurements are as given below.

|  | $\lambda$max (nm) | $\epsilon$ ($\times 10^4$) |
|---|---|---|
| 4-N,N-diethylamino-4'-nitrosodiphenylamine | 440 | 1.96 |

EXAMPLE 54

To 100 parts by weight of stirred ethanol, 3.0 parts by weight of NK 2421 (cyanine dye produced by the Japanese Institute for Photosensitizing Dyes) and 1.0 part by weight of 4-nitrosodiphenylamine were successively added and the mixture was stirred at 20° to 30° C. for 1 hour. Subsequently, the mixture was subjected to filtration under gravity through Toyo Roshi No. 2 (qualitative filter paper) and the filtrate was spin-coated uniformly onto a glass plate. The maximum absorption wavelength ($\lambda$max) of the test piece was measured to determine a reference value. Thereafter, the coated surface of the test piece was exposed to light from a lamp (DR 400T of Irie Seisakusho Co., Ltd), positioned 20 cm above, for periods of 3, 6 and 9 hours, with the time of measurement of $\lambda$max being set as zero hour. After the exposure for the respective periods, the maximum absorption wavelength ($\lambda$max) of the test piece was measured and the percent fading of the cyanine dye was calculated from the reference and measure values. The results are as shown below.

|  | Percent Fading of Cyanine Dye | | |
|---|---|---|---|
|  | 3 hour exposure | 6 hour exposure | 9 hour exposure |
| 4-N,N-diethylamino-4'-nitrosodiphenylamine | 2.1% | 3.9% | 5.0% |
| no additive | 3.5% | 6.4% | 10.0% |

EXAMPLE 55

To 100 parts by weight of stirred ethanol, 3.0 parts by weight of NK 2421 (cyanine dye produced by the Japanese Institute for Photosensitizing Dyes) and 1.0 part by weight of 4-N, N-diethylamine-4'-nitrosodiphenylamine were successively added and the mixture was stirred at 20° to 30° C. for 1 hour. Subsequently, the mixture was subjected to filtration under gravity through Toyo Roshi No. 2 (qualitative filter paper) and the filtrate was spin-coated uniformly onto a glass plate.

A light resistance test was conducted by using Atlas Fade-Ometer CI35F1(Xenon arc 6500W) produced by Toyo Seikiseisakusho Co., Ltd.

A reference value was determined in accordance with JIS L0841 by simultaneously irradiating Blue Scale A based on the First Exposure Method (Day-and-Night Method).

As a result of the sun-light test (First Exposure Method) or the Day-and-Night Method, the light resistance of the test piece was determined to be the fifth grade.

What is claimed is:

1. An optical recording medium comprising a recording layer, said recording layer comprising a light-vulnerable organic dye selected from the group consisting of polymethine dyes, triarylmethane dyes, pyrylium dyes, phenanthrene dyes, tetradehydrocholine dyes, triarylamine dyes, squarylium dyes, croconic methine dyes and cyanine dyes and a light stabilizing effective amount of a nitrosodiphenylamine compound of the formula:

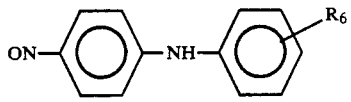

where $R_6$ is one or more members selected from the group consisting of a lower alkyl group, a halogen atom, a nitro group, a carboxyl group, a cyano group, a hydroxyehtyl group, an amino group, a hydroxyl group, an alkoxyl group, a trifluoroalkyl group, a sulfonic acid amide group, and a carboxylic acid amide group.

2. The optical recording medium according to claim 1, wherein said dye is a cyanine dye and said nitrosodiphenylamine compound is in an amount of 0.01 to 1 mole per mole of said dye.

3. An optical recording medium comprising a recording layer, said recording layer comprising a light-vulnerable organic dye selected from the group consisting of polymethine dyes, triarylmethane dyes, pyrylium dyes, phenanthrene dyes, tetradehydrocholine dyes, triarylamine dyes, squarylium dyes, croconic methine dyes and cyanine dyes and a light stabilizing effective amount of a nitrosodiphenylamine compound of the formula:

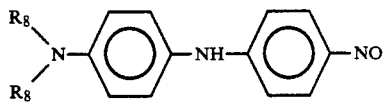

where $R_8$ is the same or different alkyl group of 1-4 carbon atoms.

4. The optical recording medium according to claim 3, wherein said dye is a cyanine dye and said nitrosodiphenylamine compound is in an amount of 0.01 to 1 mole per mole of said dye.

5. The optical recording medium according to claim 4, wherein the nitrosodiphenylamine compound is 4-N,N-diethylamine-4'-nitrosodiphenylamine of the formula:

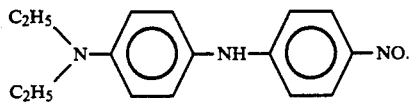

6. An optical recording medium comprising a recording layer, said recording layer comprising a light-vulnerable organic dye selected from the group consisting of polymethine dyes, triarylmethane dyes, pyrylium dyes, phenanthrene dyes, tetradehydrocholine dyes, triarylamine dyes, squarylium dyes, croconic methine dyes and cyanine dyes and a light stabilizing effective amount of a compound selected from the group consisting of 4-nitroso-4'-dimethylaminodiphenylamine and 4-nitroso-4'nitrodiphenylamine.

7. An optical recording medium comprising a recording layer, said recording layer comprising a light-vulnerable organic dye selected from the group consisting of polymethine dyes, triarylmethane dyes, pyrylium dyes, phenanthrene dyes, tetradehydrocholine dyes, triarylamine dyes, squarylium dyes, croconic methine dyes and cyanine dyes and a light stabilizing effective amount of 4-iodo-4'-nitrosodiphenylamine.

8. An optical recording medium comprising a recording layer, said recording layer comprising a light-vulnerable organic dye selected from the group consisting of polymethine dyes, triarylmethane dyes, pyrylium dyes, phenanthrene dyes, tetradehydrocholine dyes, triarylamine dyes, squarylium dyes, croconic methine dyes and cyanine dyes and a light stabilizing effective amount of a compound selected from the group consisting of 4-N,N-dimethylamine-4'-nitrosodiphenylamine and 4-N,N-diethylamino-4'-nitrosodiphenylamine.

9. The optical medium according to claim 2, wherein the cyanine dye is selected from the group consisting of merocyanine, indolenic cyanine and thiazolic cyanine.

10. The optical recording medium according to claim 2, wherein the dye is indodicarbocyanine.

11. The optical recording medium according to claim 4, wherein the cyanine dye is selected from the group consisting of merocyanine, indolenic cyanine and triazolic cyanine.

12. The optical recording medium according to claim 5, wherein the cyanine dye is indodicarbocyanine.

13. The optical recording medium according to claim 6, wherein the light vulnerable organic dye is a cyanine dye selected from the group consisting of merocyanine, indolenic cyanine and triazolic cyanine.

14. The optical recording medium according to claim 6, wherein the light vulnerable organic dye is indodicarbocyanine dye.

15. The optical recording medium according to claim 7, wherein the light vulnerable organic dye is a cyanine dye selected from the group consisting of merocyanine, indolenic cyanine and triazolic cyanine.

16. The optical recording medium according to claim 7, wherein the light vulnerable organic dye is indodicarbocyanine dye.

17. The optical recording medium according to claim 8, wherein the light vulnerable organic dye is a cyanine dye selected from the group consisting of merocyanine, indolenic cyanine and triazolic cyanine.

18. The optical recording medium according to claim 8, wherein the light vulnerable organic dye is indodicarbocyanine dye.

19. The optical recording medium according to claim 1, the nitrosodiphenylamine compound is of the formula wherein n is an integer of 1 to 3 and R' is the same or different member selected from the group consisting of a trifluoroalkyl group, a halogen atom and a nitro group.

20. The optical recording medium according to claim 19, wherein said dye is a cyanine dye and said nitrosodiphenylamine compound is in an amount of 0.01 to 1 mole per mole of said dye.

21. The optical recording medium according to claim 19, wherein the cyanine dye is selected from the group consisting of merocyanine, indolenic cyanine and triazolic cyanine.

22. The optical recording medium according to claim 19, wherein the cyanine dye is indodicarbocyanine.

23. The optical recording medium according to claim 6, wherein said nitrosodiphenylamine compound is in an amount of 0.01 to 1 mole per mole of said dye.

24. The optical recording medium according to claim 7, wherein said nitrosodiphenylamine compound is in an amount of 0.01 to 1 mole per mole of said dye.

25. The optical recording medium according to claim 8, wherein said nitrosodiphenylamine compound is in an amount of 0.01 to 1 mole per mole of said dye.

* * * * *